United States Patent [19]

Burenkov et al.

[11] 4,242,609
[45] Dec. 30, 1980

[54] WATER-COOLED ELECTROMAGNETIC BRAKE

[76] Inventors: Nikolai A. Burenkov, ulitsa Molostovykh, 2, korpus 2, kv. 54; Mikhail G. Derevyanchenko, ulitsa Saratovskaya, 3, korpus 2, kv. 126; Rikhard A. Ioganson, Kutuzovsky prospekt, 4, kv. 6; Alexandr V. Kuprianov, Chuxin tupik, 5, kv. 73; Mark B. Perchenok, ulitsa Chasovaya, 27/12, kv. 16; Evgeny V. Chegodaev, ulitsa Novgorodskaya, 34, kv. 317; Valentin I. Chulin, ulitsa Novo-Petrovskaya, 18, kv. 49, all of Moscow, U.S.S.R.

[21] Appl. No.: 966,062

[22] Filed: Dec. 4, 1978

[51] Int. Cl.$^3$ .................................. H02K 49/02
[52] U.S. Cl. .......................... 310/105; 310/54
[58] Field of Search .............. 310/54, 105, 92, 93

[56] References Cited

U.S. PATENT DOCUMENTS 3,363,123   1/1968   Jaeschke .................. 310/105
3,372,292   3/1968   Lynch et al. ............. 310/54 X

FOREIGN PATENT DOCUMENTS 1488525   9/1971   Fed. Rep. of Germany .

Primary Examiner—Donovan F. Duggan
Attorney, Agent, or Firm—Fleit & Jacobson

[57] ABSTRACT

A water-cooled electromagnetic brake of this invention has a stator accommodating thereinside a movably mounted rotor with pole teeth and an excitation winding mounted on a ring with holes, while in the stator lids there are provided toroid-shaped collectors for cooling liquid having circular slots for the introduction of said liquid fed from a gap between the stator and rotor to the collectors, and ports in the lower portion of said collectors for the removal of the cooling liquid. Each one of the pole teeth of the rotor is provided with a recess in the central portion thereof located beneath the ring with holes while the peripheral portion of the tooth has a projection receivable in the space of the collectors, the inner edge of said collectors being fashioned as a baffle close to which a labyrinth seal is provided between the rotor and the stator.

1 Claim, 1 Drawing Figure

U.S. Patent     Dec. 30, 1980     4,242,609
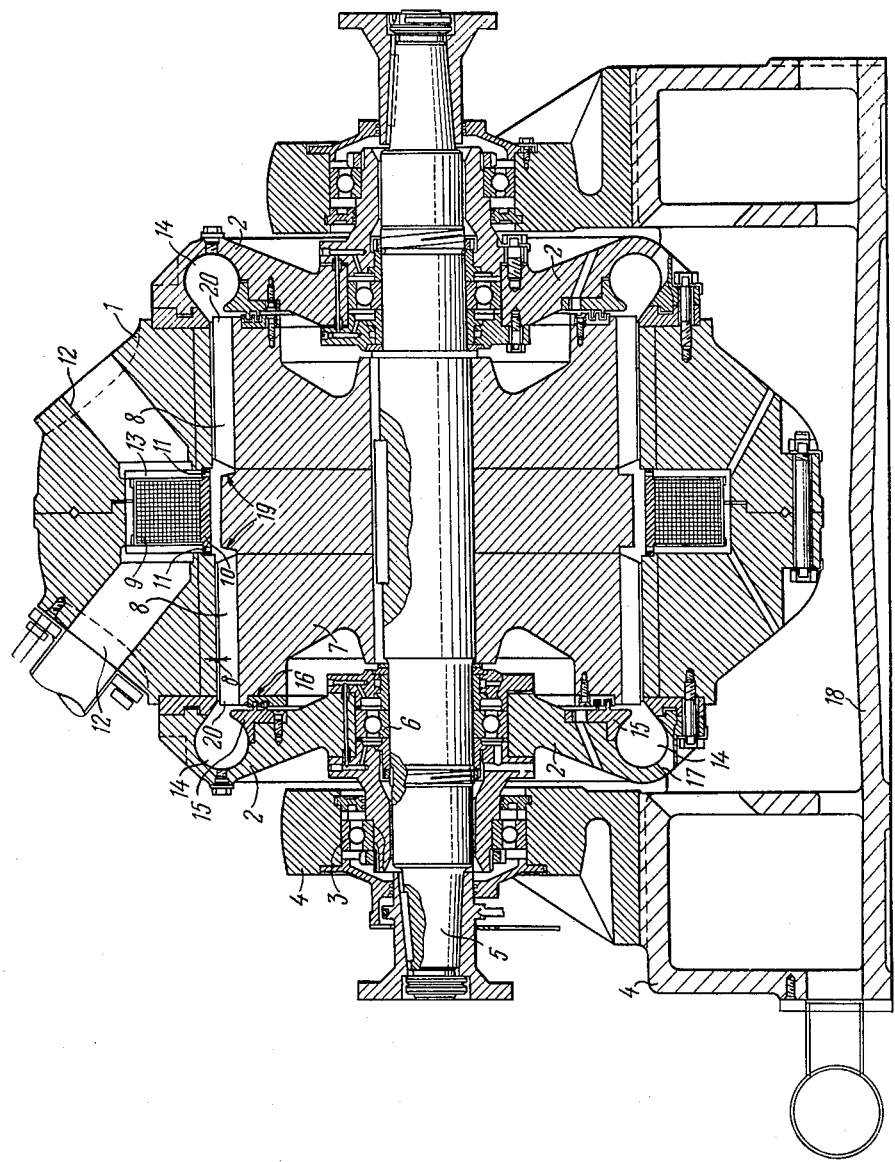

WATER-COOLED ELECTROMAGNETIC BRAKE

FIELD OF THE INVENTION

The present invention relates to electromagnetic brakes having a solid armature, whose operating principle is based on the use of eddy currents, and, more particularly, it relates to a water-cooled electromagnetic brake which can be used for testing the various vehicle motors, reducing gears and hydraulic clutches.

BACKGROUND OF THE INVENTION

There is known in the art a water-cooled electromagnetic brake (cf., F.R.G. Pat. No. 1,488,525, class H 02 K 9/19) whose stator accomodates a movably mounted rotor with pole teeth and an excitation winding arranged on a ring with holes, while in the stator lids there are provided toroidshaped collectors for cooling liquid having circular slots for the introduction of said liquid fed from a gap between the stator and rotor to the collectors, and ports in the lower portion of the collectors for the removal of the cooling liquid.

The cooling liquid in said prior art electromagnetic brake is fed into the gap between the rotor and stator from the space of the excitation winding via holes in the ring located above the central portion of the pole teeth of the rotor.

The centrifugal force developed by the pole teeth of the rotor builds up a counterpressure to the flow of cooling liquid supplied from the space of the excitation winding, which fails to ensure a forced delivery of the liquid flow into the gap.

Moreover, the cooling liquid is not further forced to the collectors from the gap.

In order to increase the efficiency of heat transfer in the stator area adjoining the gap, intricate circular channels are provided to promote additional circulation of the cooling liquid.

SUMMARY OF THE INVENTION

It is an object of the present invention to increase the efficiency of heat transfer by way of ensuring a forced delivery of cooling liquid to heat transfer areas.

It is another object of this invention to reduce the hydraulic resistance to the flow of cooling liquid.

It is still another object of the present invention to simplify the overall design of the cooling system.

In the accomplishment of said and other objects of the invention, in the stator of a water-cooled electromagnetic brake there is movably mounted a rotor with pole teeth and an excitation winding arranged on a ring with holes, while in the stator lids there are provided toroid-shaped collectors for cooling liquid having circular slots for the introduction of said liquid fed from a gap between the stator and rotor into the collectors, and ports in the lower portion of the collectors for the removal of the cooling liquid and, according to the invention, each one of the pole teeth of the rotor is provided with a recess in the central portion thereof located beneath the ring with holes, while the peripheral portion of the tooth has a projection extending into the space of the collectors, the inner edge of said collectors being fashioned as a baffle close to which a labyrinth seal is provided between the rotor and stator.

Such a structural arrangement of elements located along the cooling liquid path serves to simplify the overall design of the cooling system, as well as to ensure a forced delivery of liquid to areas of heat transfer and reduce the hydraulic resistance to the liquid flow, which results in an overall increase of heat transfer efficiency.

BRIEF DESCRIPTION OF DRAWINGS

The present invention will be more apparent upon considering the following detailed description of the preferred embodiment thereof, reference being had to the accompanying drawing which shows a sectional elevation of the water-cooled electromagnetic brake according to the present invention.

DETAILED DESCRIPTION OF THE INVENTION

Referring now to the accompanying drawing, the herein disclosed water-cooled electromagnetic brake comprises a stator 1 closed on both sides with lids 2 and balance-mounted in bearings 3 on a bed 4. Mounted on a shaft 5 and bearings 6 inside the stator 1 is a rotor 7 with pole teeth 8 which define a gap $\delta$ with the stator 1. Positioned in the middle portion of the stator 1 is an excitation winding 9 mounted on a ring 10 having radial holes 11. In its top portion, the stator 1 accomodates water-receiving spaces 12 communicating with a space 13 in which the excitation winding 9 is located. In the lids 2 of the stator 1 there are provided toroid-shaped collectors 14 opened circumferentially on the side of the rotor 7, the inner edge of the collectors 14 being fashioned as a baffle 15. A labyrinth seal 16 is provided between the rotor 7 and stator 1, close to the baffle 15. In the lower portion of the collectors 14 ports 17 are provided for draining the cooling liquid to a tray 18.

Each one of the pole teeth 8 is provided with a recess 19 in the central portion thereof located beneath the ring 10 with the holes 11.

The peripheral portion of each pole tooth 8 has a projection 20 extending into the space of the collectors 14.

The water-cooled electromagnetic brake according to the present invention operates in the following manner.

The cooling liquid flows around the excitation winding 9 and into the water-receiving spaces 12 and, via the radial holes 11 in the ring 10, into the space between the stator 1 and rotor 7. Inasmuch as the pole teeth 8 are provided in the central portion with the recess 19, the cooling liquid is not thrown back in the reverse direction upon rotation. Thereupon, the cooling liquid is supplied to the active gap $\delta$ under the effect of external pressure H=2 atm, pulverized and thrown by the teeth 8 towards the periphery of the latter to be turbulently displaced to the collectors 14 over the sections $\pi D \delta$, where D is the inner diameter of the stator 1 and $\pi$ is a constant. In so doing due to the provision of the recess 19, an enlarged air layer is formed between the teeth 8 of the rotor 7 and the stator 1, which results in a sharp reduction of hydraulic resistance to the flow of cooling liquid.

A forced dumping of the cooling liquid to the collectors 14 is promoted by the projections 20 in the peripheral portion of the pole teeth 8 of the rotor 7, extending into the space of the collectors 14 and generating a centrifugal effect upon rot rotation of the rotor 7. The baffles 15 of the collectors 14 act to guide the cooling liquid, which tends to get back to the space of the rotor 7, to the projections 20 of the rotating pole teeth 8 of the rotor 7. The liquid thrown back to the collectors 14 flows down the ports 17 to the tray 18 and further to the drain line.

The labyrinth seals 16 prevent the liquid from penetrating the zone of the bearings 6 of the rotor 7.

The size of the gap δ is very important for the operation of the cooling system. Generally, when doing electromagnetic calculations said gap δ is assumed to have the minimum possible size.

However, under conditions of high specific loads, the active gap δ selected on the basis of electromagnetic calculations may prove insufficient for the passage of the required amount of cooling liquid. In the electromagnetic brake of the invention, provision is made for the possibility of increasing the gap δ to a value depending on the πDδ section required from the viewpoint of heat transfer, which calls for a corresponding increase of the magnetizing force of the magnetic circuit of the electromagnetic brake.

In order to facilitate the introduction of liquid into the active gap δ, the ends of the pole teeth 8 near the recess 19 are made inclined towards the end portions of the rotor 7.

What is claimed is:

1. A water-cooled electromagnetic brake comprising an annular stator defining a central enclosure, stator end covers, a rotor rotatably mounted in said enclosure, peripheral pole teeth on said rotor and defining a gap between an inner surface of said stator and outer edges of said pole teeth, an excitation winding in said stator, a perforated ring supporting said excitation winding, said ring having an inner surface adjacent said outer edges of said pole teeth, toroid-shaped collectors for cooling liquid in said stator covers, said collectors having openings adjacent the periphery of said rotor for the introduction of cooling liquid fed from said gap to said collectors, ports in the lower portion of said collectors for the removal of cooling liquid, means for circulating liquid around said excitation winding, through said perforated ring, along said gap and into said collectors, said pole teeth defining recesses adjacent said ring for inhibiting reverse flow of the liquid, said pole teeth further having projections extending into said openings of said collectors, said collectors having an inner edge adjacent said opening defining a liquid deflecting baffle and labyrinth seal means between said rotor and said stator adjacent each said baffle.

* * * * *